(12) United States Patent
Touboul

(10) Patent No.: US 11,336,621 B2  
(45) Date of Patent: May 17, 2022

(54) WIFIWALL

(71) Applicant: Shlomo Touboul, Kfar Chaim (IL)

(72) Inventor: Shlomo Touboul, Kfar Chaim (IL)

(*) Notice: Subject to any disclaimer, the term of this patent is extended or adjusted under 35 U.S.C. 154(b) by 267 days.

(21) Appl. No.: 16/403,652

(22) Filed: May 6, 2019

(65) Prior Publication Data

US 2019/0349334 A1  Nov. 14, 2019

Related U.S. Application Data (60) Provisional application No. 62/668,295, filed on May 8, 2018.

(51) Int. Cl.
*H04L 29/06* (2006.01)
*H04W 12/088* (2021.01)

(52) U.S. Cl.
CPC ....... *H04L 63/0263* (2013.01); *H04W 12/088* (2021.01)

(58) Field of Classification Search
CPC . H04L 63/0263; H04L 63/18; H04L 63/1466; H04W 12/088; H04W 12/122
USPC .......................................................... 726/13
See application file for complete search history.

(56) References Cited

U.S. PATENT DOCUMENTS

| | | | |
|---|---|---|---|
| 8,514,827 B2 | 8/2013 | Matta et al. | |
| 8,838,804 B2 | 9/2014 | Beachem | |
| 10,368,360 B1 * | 7/2019 | Dash | H04L 12/2803 |
| 2005/0259611 A1 * | 11/2005 | Bhagwat | H04L 43/00 370/328 |
| 2006/0150250 A1 * | 7/2006 | Lee | H04W 12/126 726/23 |
| 2007/0025334 A1 * | 2/2007 | Meyer | H04L 63/101 370/352 |
| 2008/0244556 A1 * | 10/2008 | Plante | G06F 21/629 717/170 |
| 2013/0136018 A1 * | 5/2013 | Jeong | H04L 43/12 370/252 |
| 2016/0050227 A1 * | 2/2016 | Desai | H04L 63/1408 726/3 |
| 2017/0244672 A1 * | 8/2017 | Shulman | H04L 12/4633 |
| 2017/0279701 A1 * | 9/2017 | Ahmadzadeh | H04L 41/022 |
| 2018/0367570 A1 * | 12/2018 | Verma | H04W 12/06 |
| 2019/0349334 A1 * | 11/2019 | Touboul | H04W 12/122 |

* cited by examiner

*Primary Examiner* — Venkat Perungavoor
*Assistant Examiner* — Peiliang Pan
(74) *Attorney, Agent, or Firm* — Soquel Group I.P Ltd.

(57) ABSTRACT

A hardware device with embedded software, for detecting Wi-Fi network attacks, including random access memory storing operating software for the device, Flash or EEPROM memory storing Wi-Fi network attack rules and attack data, a Wi-Fi interface monitoring and intercepting Wi-Fi packets and Wi-Fi frames transmitted to and from a mobile station being protected by the device, embedded operating software analyzing sequences of Wi-Fi packets and frames intercepted by the Wi-Fi interface to detect an attempted Wi-Fi network attack, based on the attack rules and the attack data stored in the Flash or EEPROM memory, and sending a notification message to the mobile station when an attempted Wi-Fi network attack is detected, a processor running the embedded operating software, and a power supply supplying power to the processor, to the random access memory, to the Flash or EEPROM memory, and to the Wi-Fi interface.

21 Claims, 8 Drawing Sheets

WIFIWALL

PRIORITY REFERENCE TO PROVISIONAL APPLICATIONS

This application claims benefit of and hereby incorporates by reference U.S. Provisional Application No. 62/668,295, entitled SYSTEMS AND METHODS FOR PROVIDING WIRELESS (ALL 802.11 PROTOCOLS) NETWORK SECURITY AND MONITORING VIA AN EXTERNAL AND MOBILE DEVICE, and filed on May 8, 2018 by inventor Shlomo Touboul.

FIELD OF THE INVENTION

The present invention relates to Wi-Fi network security.

BACKGROUND OF THE INVENTION

In today's world people regularly log on to Wi-Fi networks—in hotels, restaurants, airports, shopping malls, coffee shops, and many other places, in order to access their e-mail, web sites, Internet applications, remote data, and for other needs. People connect to public Wi-Fi networks, which may be password-protected or unprotected, and to private Wi-Fi networks, which may be password-protected or unprotected.

Figure 1:
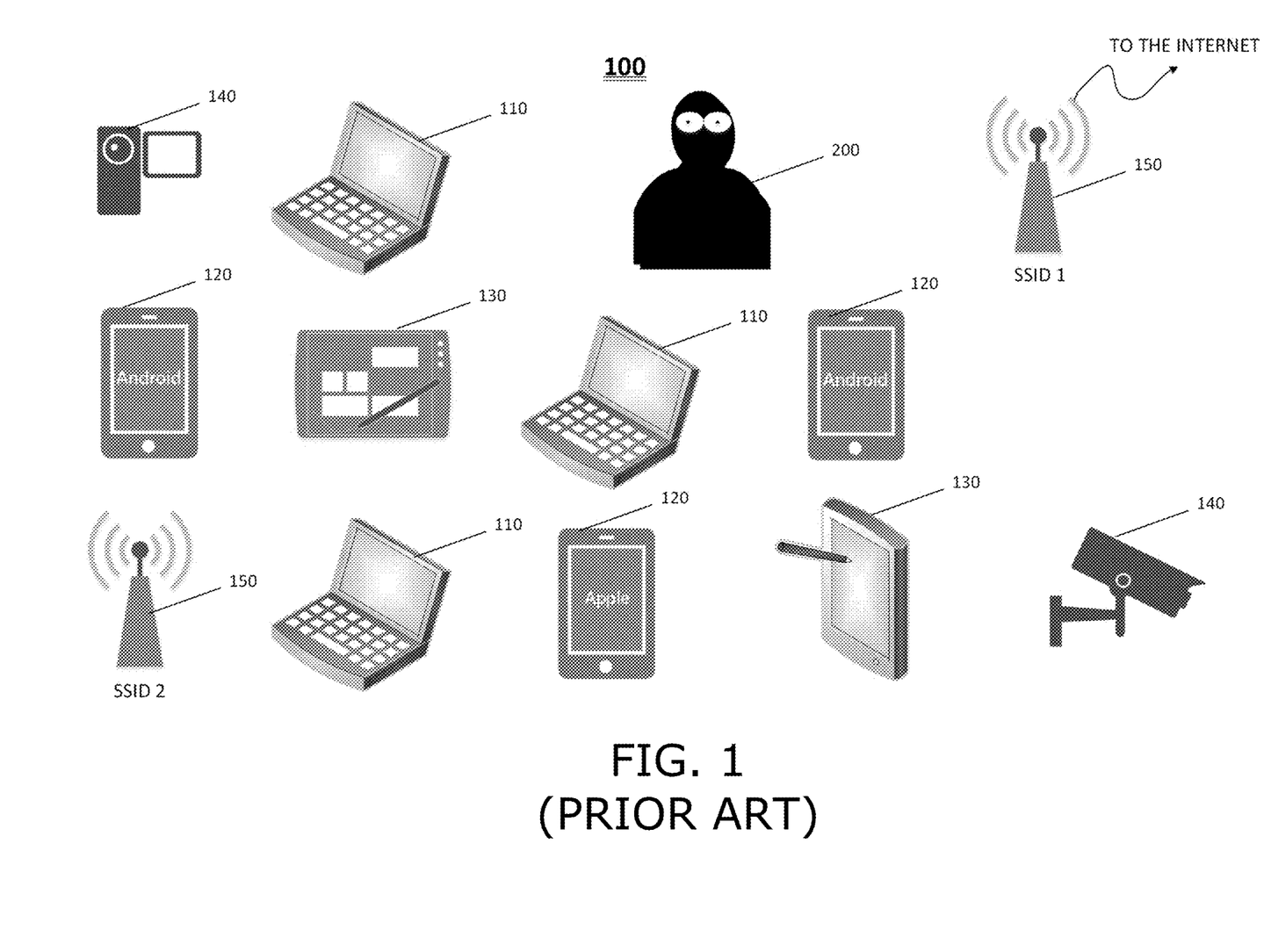
FIG. 1 is a prior art diagram of Wi-Fi network.

Reference is made to FIG. 1, which is a prior art diagram of a Wi-Fi Network 100. A Wi-Fi network is a wireless network that is based on the IEEE 802.11 standard for wireless networks. The IEEE 802.11 standard includes a series of technological advances, each defined by an amendment to the standard that is identified by a one or two-character suffice to "802.11"; e.g., 802.11a, 802.11b. The Wi-Fi network shown in FIG. 1 includes laptop computers 110, smartphones 120, tablet computers 130, Internet of Things (IoT) devices 140, and W-Fi access points 150. Also shown in FIG. 1 is an attacker 200, whose actions are described below.

The 802.11 security is based on standard protocols including inter alia Wire Equivalent Privacy (WEP), Wi-Fi Protected Access (WPA) and Wi-Fi Protected Access II (WPA2), as well as new protocols upcoming and yet to be developed. These protocols enable establishing encrypted communication between all W-Fi network nodes, stations and access points.

The 802.11 standard includes control frames, management frames and data frames. Control frames facilitate exchange of data frames between stations. Management frames, generally not authenticated, enable establishing, maintaining or discontinuing communication. Data frames generally include data and statuses.

Examples of 802.11 management frames include inter alia:
  Action
  Authentication
  Association
  Beacon
  De-authentication
  Disassociation
  Probe
  Reassociation.

Management frames enable a station to communicate with an access point, and vice versa enable association and establishment/management of an encrypted communication channel between them. Once a communication is established, data is exchanged in an encrypted form as agreed to by the two sides during an authentication phase.

A Wi-Fi network attack is a cyber-attack within the vicinity of a Wi-Fi network, that uses the 802.11 protocol and frames to attack stations and access points within the Wi-Fi network. A first type of Wi-Fi network attack is a Rogue Access Point (RAP) attack. In a RAP attack, an attacker uses De-authentication frames to force a victim station to disconnect from a current access point and to reconnect to a RAP established by the attacker, from which the victim's data is decrypted and stolen.

Figure 2:
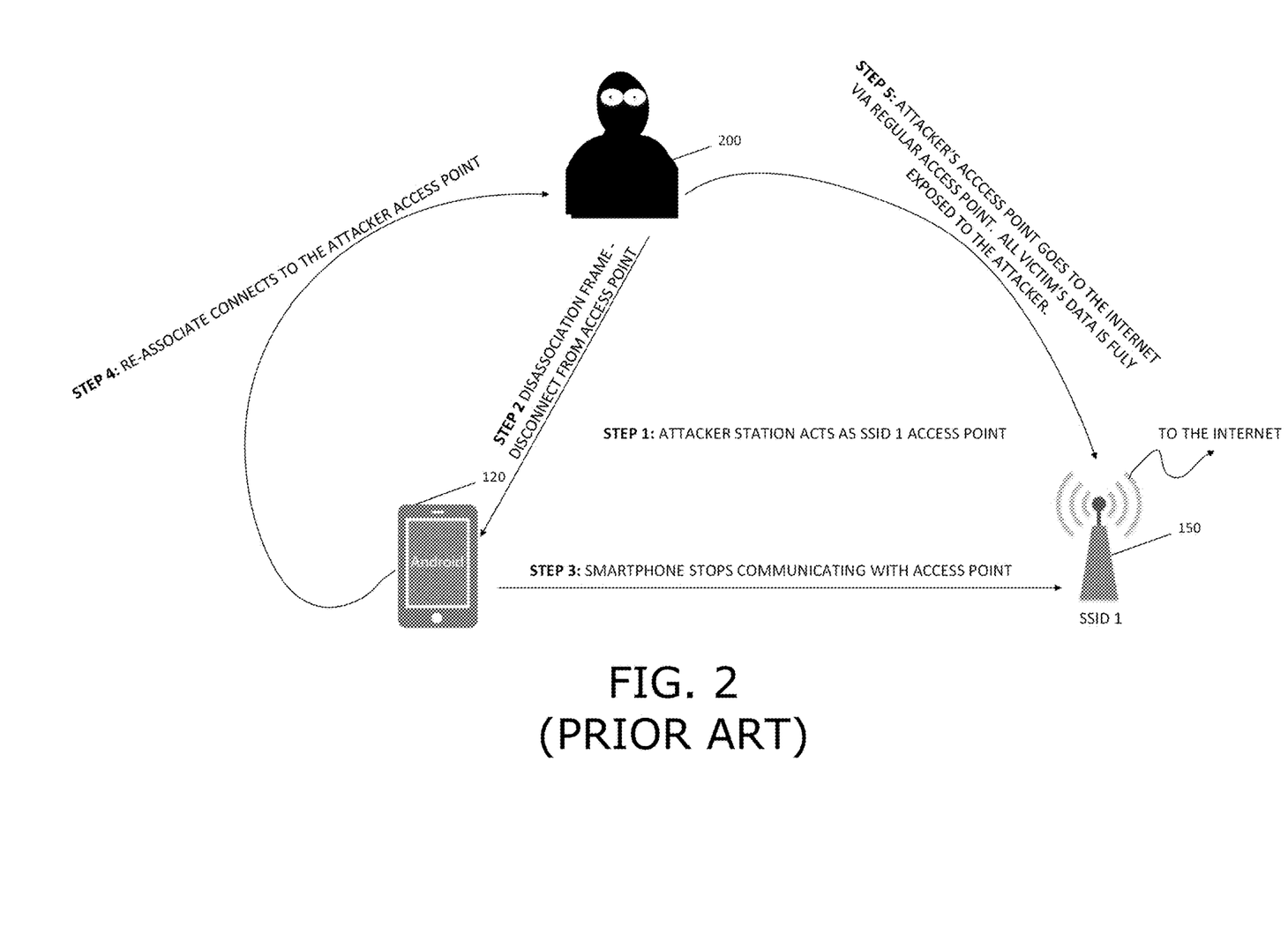
FIG. 2 is a prior art diagram of hijacking a Wi-Fi network by an attacker.

Reference is made to FIG. 2, which is a prior art diagram of hijacking a Wi-Fi network by an attacker. As shown in FIG. 2, the hijacking is carried out in five steps. At a first step, an attacker's station acts as an SSID 1 access point. At a second step, attacker 200 generates a Disassociation frame, in response to which smartphone 120 disconnects from its legitimate access point 150. At a third step, smartphone 120 stops communicating with access point 150. At a fourth step, attacker 200 generates a Re-associate frame, in response to which smartphone 120 connects to attacker 200 access point. At a fifth step, attacker 200 access point goes to the Internet via a regular access point, and all of the victim's data is fully exposed to attacker 200.

A second type of Wi-Fi network attack is a password attack. In a password attack, attacker 200 first sniffs a WPA 4-way handshake; namely, the frames that are sent back and forth during an authentication phase, in order to mount a brute-force or dictionary-based WPA password cracking attack on a Wi-Fi user with WPA or WPA2 enabled. A user is elicited to provide the 4-way handshake information by first forcing the user offline with a De-authentication attack. In a similar phishing-style attack without password cracking, Wifiphisher, a known attacker's tool that can be downloaded from the Internet, starts with a De-authentication attack to disconnect the user from his legitimate access point, and then mounts a man-in-the-middle attack to collect passwords supplied by an unwitting user.

A third type of Wi-Fi network attack is a Key Reinstallation Attack (KRACK). A KRACK attack is a severe Wi-Fi attack that requires a great deal of time and effort to prevent smartphones and computing devices from being exposed to the attack. A KRACK attack, published in October 2017, may be the worst Wi-Fi attack in the world. In a KRACK attack, an attacker repeatedly resets the "nonce" transmitted in the third frame of the WPA2 handshake, to gradually match encrypted packets seen earlier, and learn the full keychain used to encrypt the traffic. As such, all traffic to and from a victim's smartphone 120 or other computing device is fully exposed to the attacker, while the victim believes he is protected within an encrypted Wi-Fi environment. Since a cure to this attack requires updating all Wi-Fi interfaces, devices and routers in the world, the KRACK attack will likely remain available to hackers for years to come.

A fourth type of Wi-Fi network attack is a sniffing attack. In a sniffing attack, attacker 200 sniffs data of every user station of a Wi-Fi network. If the Wi-Fi network is encrypted, attacker 200 obtains a connection password from a Wi-Fi owner.

A fifth type of attack is an Evil Twin attack. In an Evil Twin attack attacker 200 sets up a station that publishes itself as an access point. The attacker's access point name may be similar to the SSID name of an existing access point, diverting other Wi-Fi stations to connect to it, instead of to the existing SSID, or simply luring Wi Fi stations to connect and gain a free Internet connection. In an Evil Twin attack attacker 200 spoofs the MAC address of the original access point. A common way to allow Wi-Fi stations to connect to a public access point is by publishing a "splash screen". This is the case, for example, when a guest connects to a hotel Wi-Fi network and a splash screen, which is an HTML page sent from a local access point, requests the room number and family name of the user. In other cases, such as an airport Wi-Fi network, the splash screen asks a user to approve an end user license agreement. In such cases the user station is not yet connected to the Internet and therefore it cannot use a virtual private network (VPN) service, since it has no access to the VPN server via the Internet. Attacker 200 spoofs the splash screen and sends to the user station a same-looking HTML page, but the attacker's page has malware, a trojan horse or another malicious payload embedded therein. An Evil Twin attack extends the scope of the attack well beyond the local Wi-Fi network, and keeps the user station infected for a long period after leaving the attacker's Wi-Fi network.

The above types of Wi-Fi network attacks involve techniques whereby attacker 200 gains access to the traffic of a specific station or of a few stations within a Wi-Fi network, while the users of these stations are clueless as to what is happening.

Once attacker 200 gains access to network traffic, attacker 200 can inflict damage such as (i) data leaks, whereby attacker 200 obtains access to a victim's data on his device and on the cloud; (ii) phishing attack, whereby a user logs in with his credentials to a fake web service and from then on attacker 200 has the user's credentials; (iii) installing malware, whereby attacker 200 injects content into the user's device, such as a virus, a Trojan horse or other malware that gains for attacker 200 full access to the device content; and (iv) installing ransomware, whereby attacker 200 injects a Ransomware to encrypt the user's device content, which is only released upon paying a ransom to attacker 200.

There are many other ways for attacker 200 to exploit the 802.11 protocol, to hijack communication, to deliver an attack payload that is of benefit to attacker 200, and to damage a user's station.

As such, it would be of great advantage to have a device that monitors Wi-Fi network traffic to identify 802.11 frames and communication content used by attacker 200 to attack user stations.

SUMMARY

Embodiments of the present invention provide inter alia a small external mobile device, referred to herein as a Wifi-Wall, including hardware and software, that constantly monitors Wi-Fi network traffic to identify 802.11 frames and communication content used by an attacker to attack one or more user stations. Of significance, embodiments of the present invention require no changes in the protocol or software on the user stations or on Wi-Fi access points.

The WifiWall includes an interrogator that executes a specific set of actions corresponding to each specific type of attack, each action being a set of queries. The investigator may query access points, an access control system and/or a Security Information and Event Manager (SIEM) for the Wi-Fi network. The investigator may query a file server, a directory server and/or any other entity in the Wi-Fi network. The investigator may query a victim station. The investigator may collect Wi-Fi frames logged before, during and after an attack.

The WifiWall obtains updates, via update servers and via the Internet, to learn new attack techniques, to ensure that the WifiWall is always up-to-date with the latest Wi-Fi network attacks.

There is thus provided in accordance with an embodiment of the present invention a hardware device with embedded software, for detecting Wi-Fi network attacks, including random access memory storing operating software for the device, Flash or EEPROM memory storing Wi-Fi network attack rules and attack data, a Wi-Fi interface monitoring and intercepting Wi-Fi packets and Wi-Fi frames transmitted to and from a mobile station being protected by the device, embedded operating software analyzing sequences of Wi-Fi packets and frames intercepted by the Wi-Fi interface to detect an attempted Wi-Fi network attack, based on the attack rules and the attack data stored in the Flash or EEPROM memory, and sending a notification message to the mobile station when an attempted Wi-Fi network attack is detected, a processor running the embedded operating software, and a power supply supplying power to the processor, to the random access memory, to the Flash or EEPROM memory, and to the Wi-Fi interface.

There is additionally provided in accordance with an embodiment of the present invention a method for detecting Wi-Fi network attacks, including monitoring, by a hardware device external to a mobile device, 802.11 frames that are transmitted to and from the mobile device over a Wi-Fi network to which the mobile device is connected, searching, by the hardware device, for 802.11 management frames that indicate an attempt by an attacker to hijack connection of the mobile device, comparing, by the hardware device, a sequence of the monitored frames to pre-defined attack rule sequences, detecting, by the hardware device, a sequence of frames that corresponds to an attack, based on the comparing, and sending, by the hardware device, a notification message regarding the attack detected by the detecting, via an out-of-band channel, to the mobile device.

BRIEF DESCRIPTION OF THE DRAWINGS

The present invention will be more fully understood and appreciated from the following detailed description, taken in conjunction with the drawings in which.

For reference to the figures, TABLE I below lists elements and their numerals. Similarly numbered elements represent elements of the same type, but they need not be identical elements. Elements in the figures numbered in the 1000's are operations of flow charts.

TABLE I

Index of elements in the figures

| Element | Description |
|---|---|
| 100 | prior art Wi-Fi network |
| 110 | laptop computers |
| 120 | smartphones |
| 130 | tablet computers |
| 140 | Internet of Things (IoT) devices |
| 150 | Wi-Fi access points |
| 200 | attacker |
| 300 | WifiWall device |
| 310 | random access memory (RAM) |
| 320 | Flash/EEPROM memory |
| 330 | Wi-Fi interface |
| 340 | processor |
| 350 | power supply |
| 360 | optional BLUETOOTH ® interface |
| 370 | optional display |
| 380 | optional battery |
| 390 | embedded device operating software |
| 392 | attack rules |
| 394 | attack data |
| 395 | investigator |
| 396 | update manager |
| 398 | pairing manager |
| 400 | update servers |

DETAILED DESCRIPTION

Embodiments of the present invention provide inter alia a small independent external mobile device, referred to herein as a WifiWall, including hardware and software, that constantly monitors Wi-Fi network traffic to identify 802.11 frames and communication content used by an attacker to attack one or more user stations. TABLE II below lists some of the components of the WifiWall.

TABLE II

WifiWall components

Figure 3:
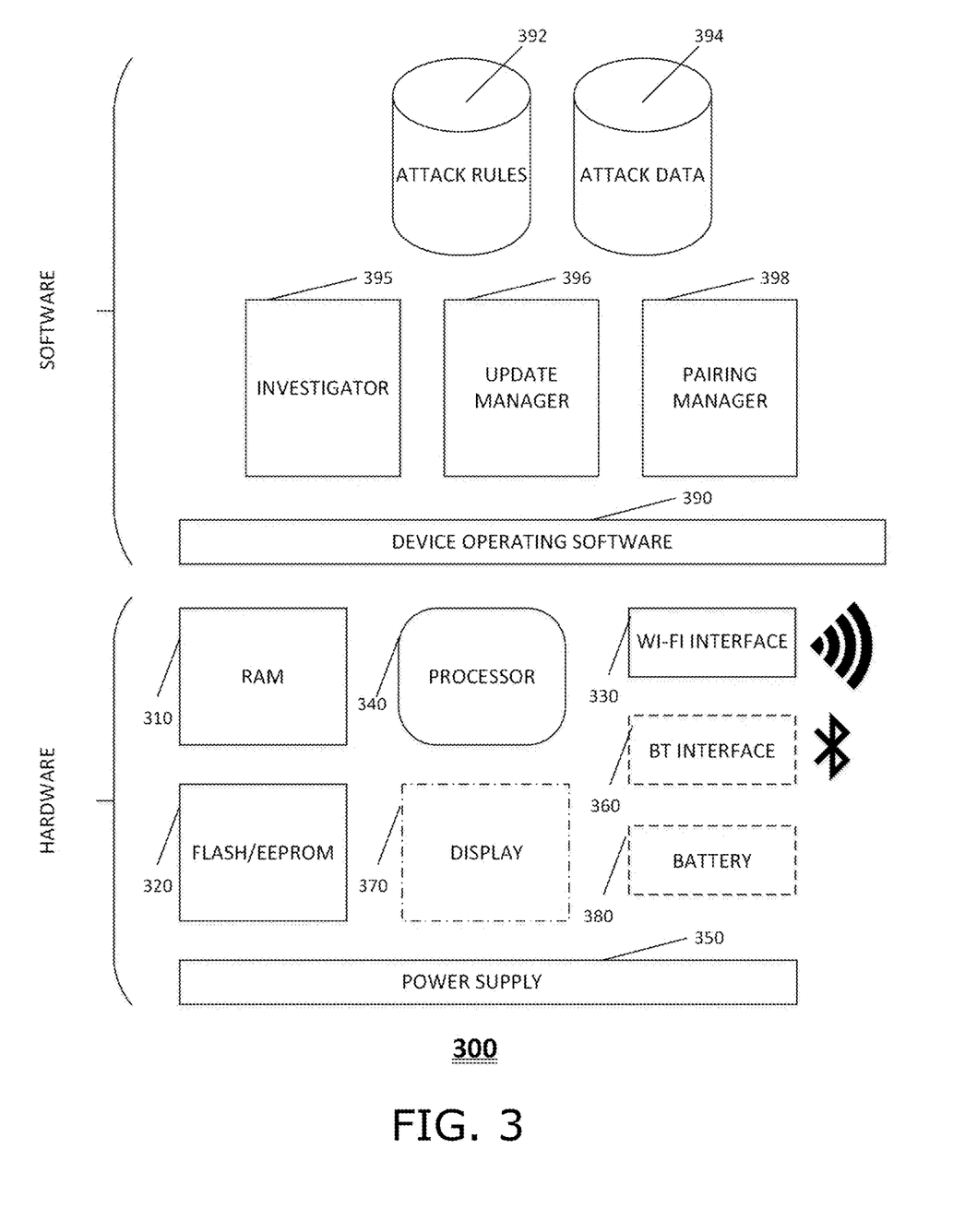
FIG. 3 is a simplified block diagram of a WifiWall, in accordance with an embodiment of the present invention.

Processor, memory, power supply capable of running the WifiWall operation software, and storing data and code in the memory
Software implementing the WifiWall system
Wi-Fi interface capable of operating in a <u>monitor mode</u>, intercepting all Wi-Fi packets and frames in its vicinity
Optional BLUETOOTH ® (BT) interface to bind to other devices via a BT protocol-$2^{nd}$ protocol, or out-of-band
Optional battery to enable the WifiWall to work without a cord and without external power
Optional display to display status and alerts Reference is made to FIG. 3, which is a simplified block diagram of WifiWall 300, in accordance with an embodiment of the present invention. As shown in FIG. 3, WifiWall 300 includes (i) random access memory (RAM) 310 for storing operating software 390; (ii) Flash or EEPROM memory 320 for storing Wi-Fi network attack rules 392 and attack data 394, (iii) a Wi-Fi interface 330 for monitoring and intercepting Wi-Fi packets and Wi-Fi frames in the vicinity of WifiWall 300, (iv) embedded operating software 390 analyzing sequences of Wi-Fi packets and frames intercepted by Wi-Fi interface 330 to detect an attempted Wi-Fi network attack, based on attack rules 392 and attack data 394 stored in Flash or EEPROM memory 320, and sending a notification message to a mobile station when an attempted Wi-Fi network attack is detected, (v) a processor 340 for running embedded software 390, and (vi) a power supply 350 for supplying power to processor 340, to RAM 310, to Flash or EEPROM memory 320, and to Wi-Fi interface 330.

Embedded operating software 390 includes an investigator 395, an update manager 396 for updating attack rules 392 and attack data 394, and a pairing manager 398 for pairing WifiWall 300 with another device in its vicinity. Operation of pairing manager 398 and update manager 396 are described below with reference to FIGS. 7 and 8, respectively.

Investigator 395 performs a set of actions defined in the rule base. Investigator 395 is launched as an initial response to any detected attack. Interrogator 395 executes a specific set of actions corresponding to each specific type of attack. An action includes a set of queries. An action may be inter alia, a query to an access point (i) detecting its version or current configuration; (ii) checking if the access point includes a splash screen and, if so, downloading the splash screen and archiving it in an investigation findings data area; (iii) detecting its DNS configuration—if all URLs are diverted to a single HTML page or IP address. An action may query an access control system and/or a Security information and Event Manager (SIEM) for the Wi-Fi network. An action may query a machine learning system, an artificial intelligent system, and/or a big data harvesting system. An action may be a query to a victim station detecting its operating system and application configurations, memory content and file system content. An action may be a query to a file server, if it exists, a directory server, and/or any other entity in the W-Fi network. An action may be a query to collect Wi-Fi frames logged before, during and after the attack. Results of actions are archived in the investigation findings data area, and are available to determine what attack happened, and by which entity.

As further shown in FIG. 3, optionally WifiWall 300 also includes (i) a BLUETOOTH® (BT) interface 360 to bind WifiWall 300 to other devices in its vicinity using a BT protocol ($2^{nd}$ protocol, or out-of-band), (ii) a display 370 to display notification messages generated by said embedded operating software, status and alerts, and (iii) a battery 380 to enable WifiWall to operate without a cord and without external power.

Figure 4:
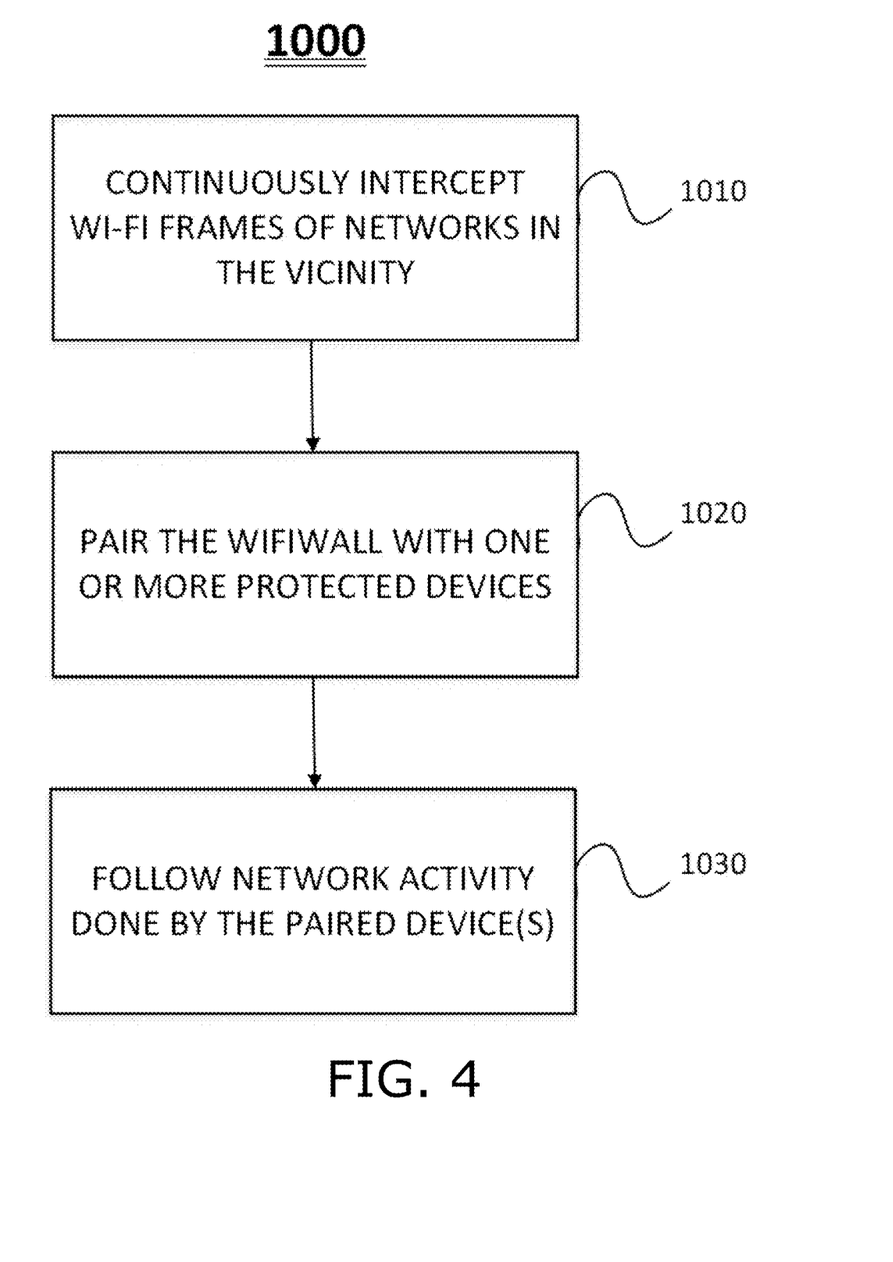
FIG. 4 is a simplified flowchart of operation of a WifiWall, in accordance with an embodiment of the present invention.

Reference is made to FIG. 4, which is a simplified flowchart 1000 of operation of WifiWall 300, in accordance with an embodiment of the present invention. At operation 1010 WifiWall 300 continuously intercepts Wi-Fi frames of Wi-Fi networks in its vicinity. At operation 1020 WifiWall 300 is paired with a device, such as a laptop computer 110, a smartphone 120, a tablet computer 130, or an Internet of Things device 140 (FIG. 1) that it protects. In particular, WifiWall 300 has the MAC address of the device that it protects in its local memory. A pairing, i.e., transfer of the protected MAC address from the protected device to WifiWall 300, may be performed by using a BT channel of WifiWall 300 to pair and send the Wi-Fi MAC address from the protected device to WifiWall 300. Alternatively, the pairing may be performed by other means.

When WifiWall 300 is paired with the protected device, WifiWall 300 focuses on packets sent to and from the paired MAC address. WifiWall 300 may be paired with one or multiple protected devices. At operation 1030, upon pairing, WifiWall 300 follows network activity performed by the paired device(s), and ignores un-paired devices.

Figure 5:
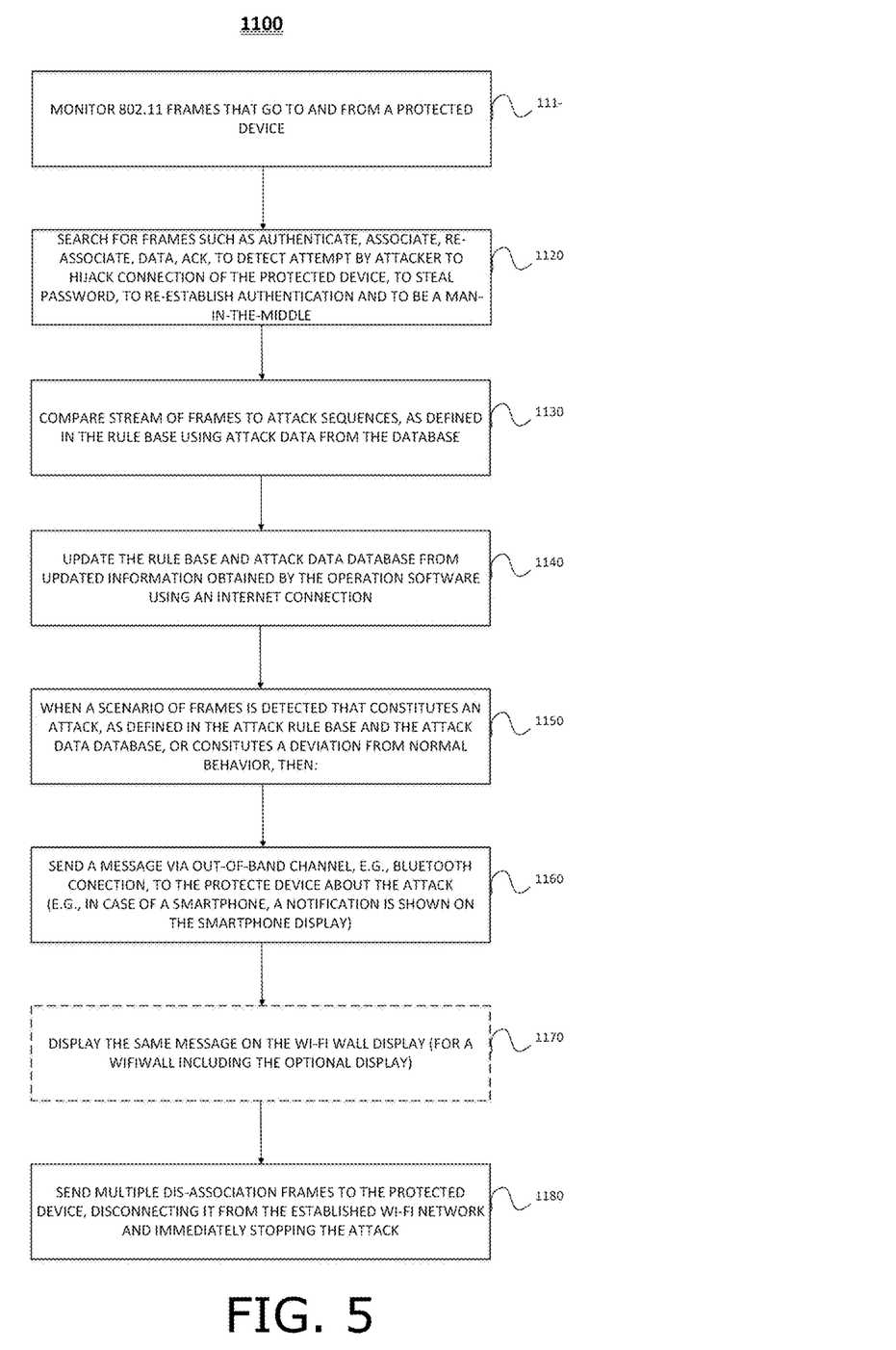
FIG. 5 is a simplified flowchart of a WifiWall detecting an attack, in accordance with an embodiment of the present invention.

Reference is made to FIG. 5, which is a simplified flowchart 1100 of WifiWall 300 detecting an attack, in accordance with an embodiment of the present invention. At operation 1110, WifiWall 300 monitors 802.11 frames that go to and from a protected device. At operation 1120, WifiWall 300 searches for frames including inter alia Authenticate, Associate, Re-associate, Data, and ACK, to detect an attacker attempt to hijack the connection of the protected device, to steal a password, to re-establish authentication, and/or to be a man-in-the-middle.

At operation 1130 WifiWall 300 compares a stream of frames to attack sequences as defined in attack rules 392, using attack data 394. For example, a set of attack rules and attack data for detecting a KRACK attack may be as follows.

Launch investigator module 395.
      Within the four handshake frames and responses of establishing an agreed encryption key, a reset of frame #3 with '0000' is detected.
      The MAC address of the entity sending the frame #3 is different from the SID MAC address.
      Report KRACK attack, and send Disassociation and De-authentication frames to the victim station.

The attack rules 392 and attack data 394 may be stored in attack rule and attack data databases. At operation 1140 the attack rules 392 and attack data 394 databases are updated via an Internet connection. Operating software 390 is also updated via the Internet connection.

At operation 1150 WifiWall 300 detects a scenario of frames that constitute an attack, as defined in the attack rules 392 database and the attack data 394 database. At operation 1160 WifiWall 300 sends a notification message via an out-of-band channel, e.g., via a BT connection, to the protected device about the attack. E.g., for a protected smartphone 120, a Wi-Fi notification is presented on the smartphone display. At optional operation 1170 WifiWall 300 displays the same message, or a similar message, on its display 370, if WifiWall 300 includes optional display 370. At operation 1180 WifiWall 300 sends multiple Disassociation frames to the protected device, thus disconnecting it from the established Wi-Fi network and stopping the attack.

Further, at operation 1150 Wi-Fi Wall 300 detects a scenario of frames that deviates from normal behavior of that Wi-Fi network. WifiWall attack rules 392 base includes a data section that describes what is an expected normal behavior of the network. A normal behavior is a collection of data points and statistics based on 802.11 frames. Normal behavior includes inter alia an expected number of failed Authentication frames, an expected number of De-authentication frames, and an expected number of Action frames to switch communication channel. These statistics are recorded during operation of WifiWall 300 and are used to characterize normal behavior. These statistics are also stored in the attack rules 392 base. Whenever WifiWall 300 detects deviation from normal behavior, e.g., a dramatic increase of failed authenticated frames related to many different source addresses, meaning that many station authentications are being rejected, the deviation is considered to be abnormal behavior of the Wi-Fi network. Abnormal behavior may be caused by a rogue access point that diverts stations from an existing access point to an attacker 200 access point. Optionally, when WifiWall 300 identifies abnormal behavior, Wifi-Wall 300 launches investigator 395 to perform its investigation. Investigator 395 queries suspected access point parameters and configuration, and checks logged frames to determine if at any time, attacker 200 access point presented itself and began diverting stations.

The data in attack rule 392 base and attack data 394 base, including statistics characterizing normal behavior of a current Wi-Fi network, may be sent to a cloud server. The cloud server maintains a central database of such information, received from different WifiWalls 300. If a WifiWall 300 transmits normal behavioral statistics of a Corporate-ABC Wi-Fi network, and subsequently another WifiWall 300 also transmits normal behavioral statistics of the same CorporateABC network, both reported behaviors are integrated into consolidated normal behavioral statistics of CorporateABC, and stored in the cloud server's central database. The consolidated behavioral statistics represent an update that is sent with attack rule 392 base updates to WifiWalls 300 that request attack rule base updates, as described below with reference to FIG. 8.

Figure 6:
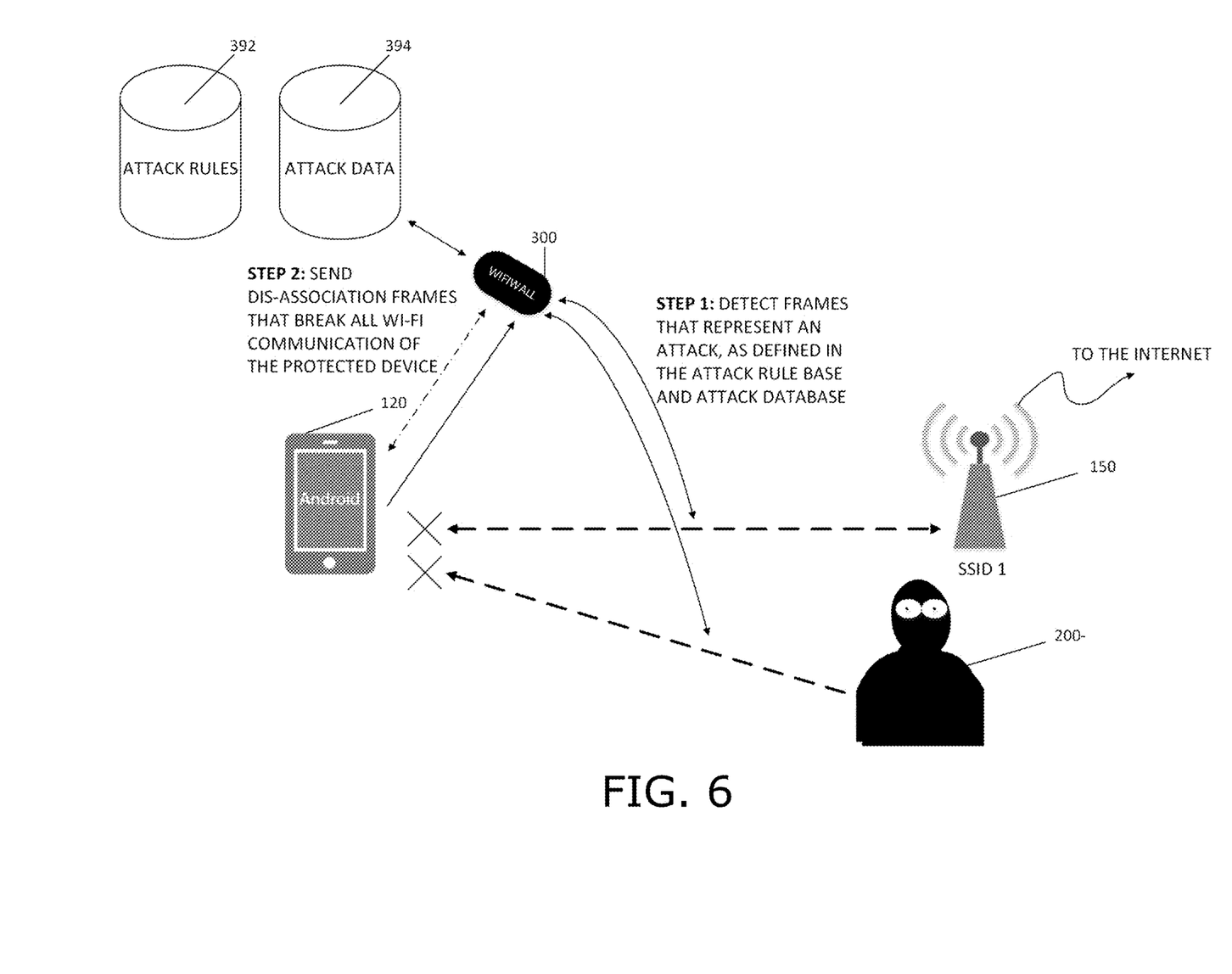
FIG. 6 is a simplified diagram showing a WifiWall detecting an attack, in accordance with an embodiment of the present invention.

Reference is made to FIG. 6, which is simplified diagram showing WifiWall 300 detecting an attack, in accordance with an embodiment of the present invention. As shown in FIG. 6, at a first step, WifiWall 300 detects frames that represent an attack, as determined from attack rules 392 and attack data 394. In response to the attack detection, WifiWall 300, at a second step, sends Disassociation frames that sever all Wi-Fi communication, of protected device 120.

Figure 7:
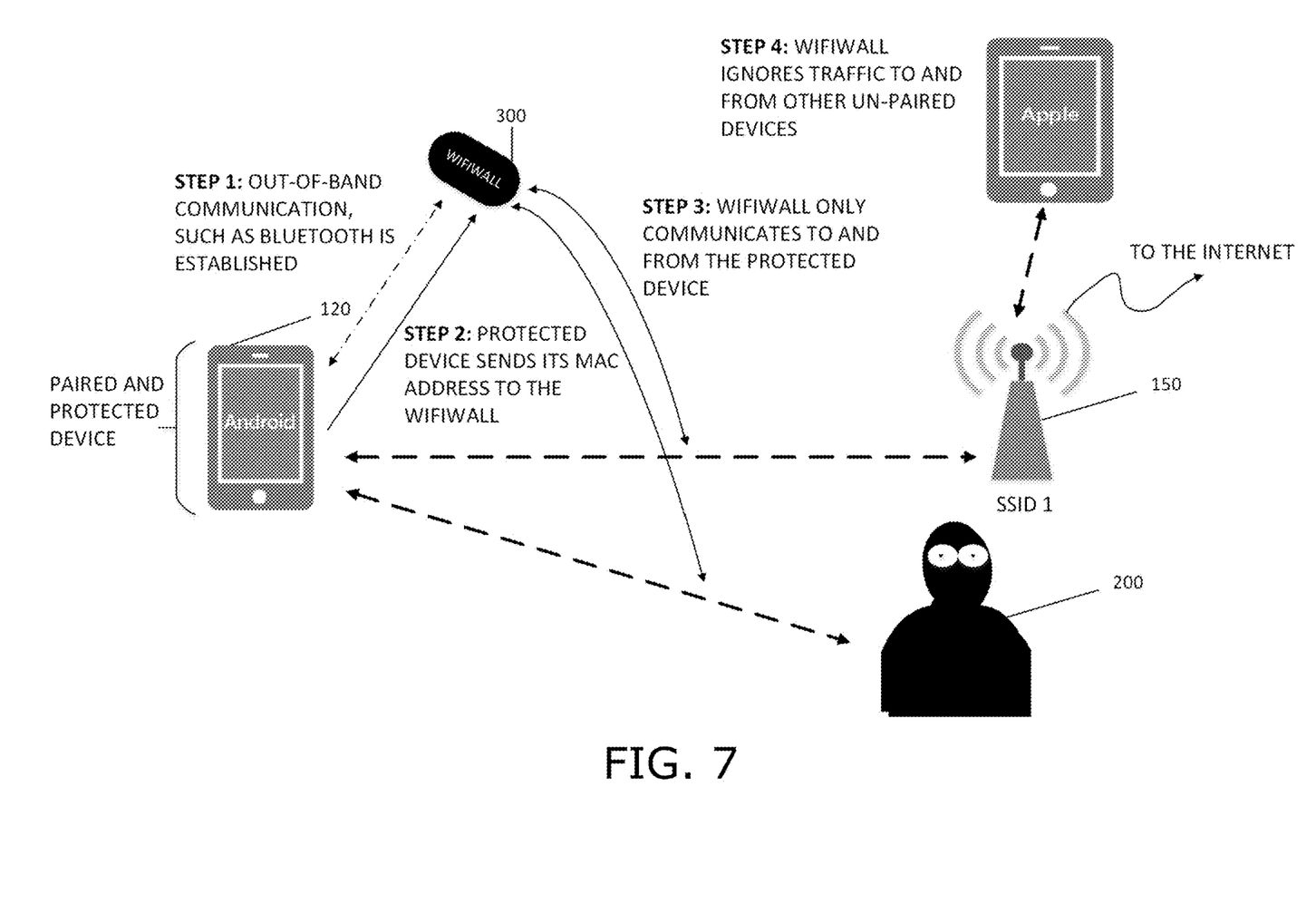
FIG. 7 is a simplified diagram showing a WifiWall pairing with a user device, in accordance with an embodiment of the present invention.

Reference is made to FIG. 7, which is a simplified diagram showing WifiWall 300 pairing with user device 120, in accordance with an embodiment of the present invention. As shown in FIG. 7, at a first step, pairing manager 398 (FIG. 3) of WifiWall 300 establishes out-of-band communication, such as BT communication, between WifiWall 300 and protected device 120. At a second step, protected device 120 sends its MAC address to pairing manager 398. At a third step, WifiWall 300 monitors only communication to and from protected device 120; and, at a fourth step WifiWall 300 ignores traffic to and from un-paired devices.

Figure 8:
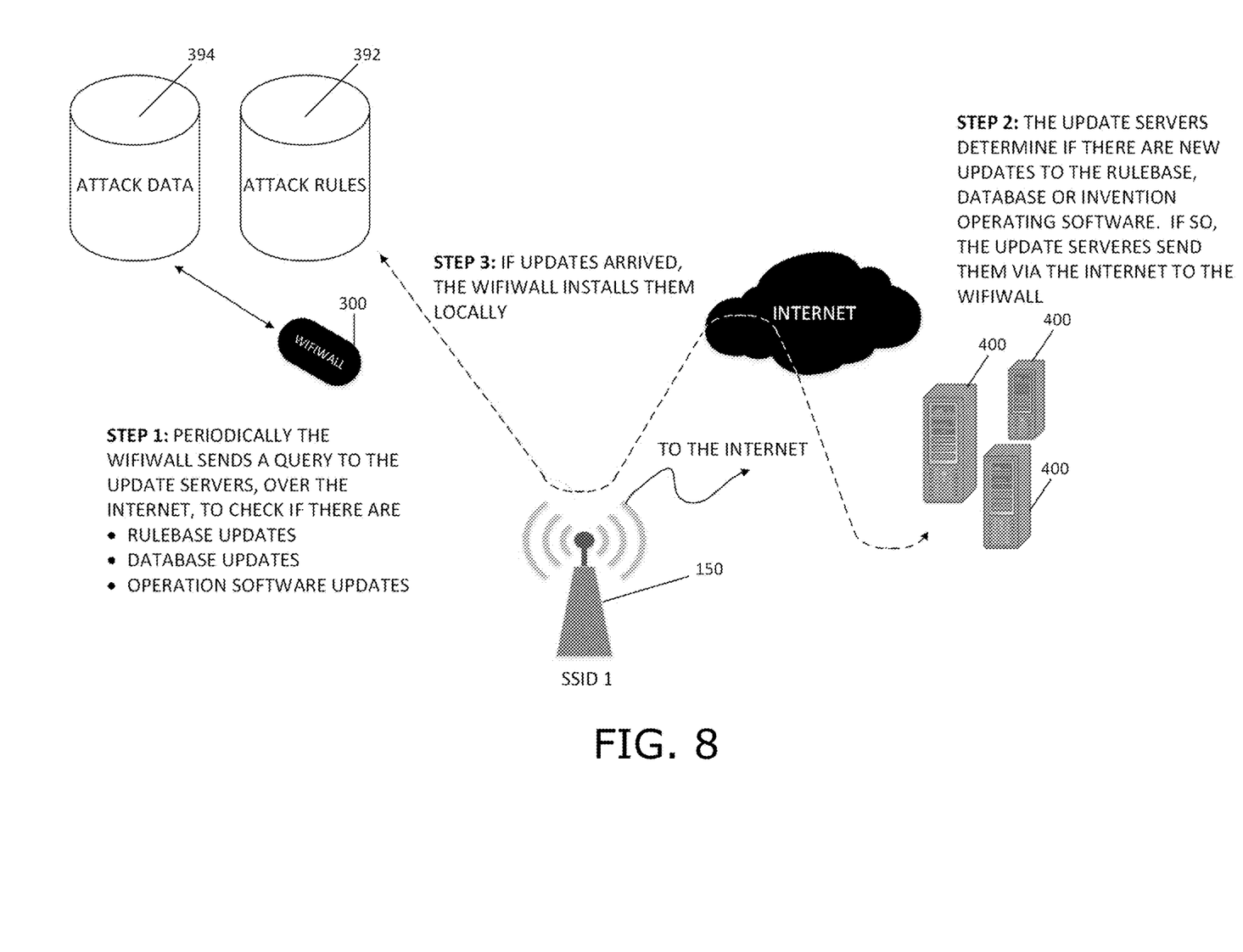
FIG. 8 is a simplified diagram showing attack rule and attack data updates, in accordance with an embodiment of the present invention.

Reference is made to FIG. 8, which is a simplified diagram showing attack rule and attack data updates, in accordance with an embodiment of the present invention. As shown in FIG. 8, at a first step update manager 396 (FIG. 3) of WifiWall 300 periodically sends queries to update servers 400, via the Internet, to check if there are (i) attack rule 392 updates, (ii) attack data 394 updates, and/or (iii) operation software 390 updates. At a second step, update servers 400 check if there are new updates to the attack rules, attack data and/or the operating software. If so, update servers 400 send the updates to WifiWall 300 via the Internet. At a third step, update manager 396 installs new updates that it receives, locally on WifiWall 300.

As such, it will be appreciated that embodiments of the present invention provide an independent small external device, namely, the WifiWall, including hardware and software, that monitors Wi-Fi network traffic to identify 802.11 frames and/or communication content that is used by an attacker to attack a specific station or set of stations. The WifiWall requires no changes in the protocol or software in the stations or in the Wi-Fi access points. The WifiWall receives updates from update servers and via the Internet, and learns new attack techniques from time to time. As such, the WifiWall is always up-to-date with the latest Wi-Fi network attacks.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A hardware device with embedded software, for detecting Wi-Fi network attacks, comprising:
    random access memory storing operating software for the device;

Flash or EEPROM memory storing Wi-Fi network attack rules and attack data;

a Wi-Fi interface monitoring and intercepting Wi-Fi packets and Wi-Fi frames transmitted to and from a mobile station being protected by the device;

embedded operating software analyzing sequences of Wi-Fi packets and frames intercepted by said Wi-Fi interface to detect an attempted Wi-Fi network attack, based on the attack rules and the attack data stored in said Flash or EEPROM memory, and sending a notification message to the mobile station when an attempted Wi-Fi network attack is detected, the embedded operating software comprising an investigator that queries a Wi-Fi access point to the Wi-Fi network, to detect the access point's DNS configuration and determine if URLs are diverted to a single HTML page or IP address;

a processor running the embedded operating software; and a power supply supplying power to said processor, to said random access memory, to said Flash or EEPROM memory, and to said Wi-Fi interface.

2. The device of claim 1 wherein said embedded operating software updates the attack rules and attack data from time to time based on updates that it receives via the Internet from remote update servers.

3. The device of claim 1 wherein the device updates said embedded operating software from time to time based on updates that it receives via the Internet from remote update servers.

4. The device of claim 1 further comprising a BLUETOOTH® (BT) interface, and wherein said embedded operating software binds the device to the mobile station via a BT protocol.

5. The device of claim 1 further comprising a display displaying the notification message sent by said embedded operating software.

6. The device of claim 1 further comprising a battery for supplying power to said processor, said random access memory, said Flash or EEPROM memory, and to said Wi-Fi interface in lieu of or in addition to said power supply.

7. The device of claim 1 wherein said investigator detects the access point's version or current configuration, and checks if the access point includes a splash screen and, if so, downloads the splash screen.

8. The device of claim 1 wherein said investigator queries the mobile station to detect the mobile station's operating system and application configurations, memory content and file system content.

9. The device of claim 1 wherein said investigator queries a file server, a directory server or any other entity in the Wi-Fi network.

10. The device of claim 1 wherein said investigator queries an access control system for the Wi-Fi network.

11. The device of claim 1 wherein said investigator queries a Security information and Event Manager (SIEM) for the Wi-Fi network.

12. The device of claim 1 wherein said investigator queries one or more of: a machine learning system, an artificial intelligent system, and a big data harvesting system.

13. The device of claim 1 wherein said investigator collects Wi-Fi frames logged before, during and after an attack.

14. A method for detecting Wi-Fi network attacks, comprising:

intercepting, by a hardware device external to a mobile device, 802.11 frames that are transmitted to and from the mobile device over a Wi-Fi network to which the mobile device is connected;

searching, by the hardware device, for 802.11 management frames that indicate an attempt by an attacker to hijack connection of the mobile device;

comparing, by the hardware device, a sequence of the monitored frames to pre-defined attack rule sequences;

detecting, by the hardware device, a sequence of frames that corresponds to an attack, based on said comparing;

launching, by the hardware device, investigator program code that queries a Wi-Fi access point to the Wi-Fi network, to detect the access point's DNS configuration and determine if URLs are diverted to a single HTML page or IP address; and sending, by the hardware device, a notification message regarding the attack detected by said detecting, via an out-of-band channel, to the mobile device.

15. The method of claim 14 further comprising sending, by the hardware device, multiple disassociation frames to the mobile device, thereby disconnecting the mobile device from the Wi-Fi network to which the mobile device is connected, and stopping the attack.

16. The method of claim 14 further comprising displaying, by the mobile device, the notification message received from the hardware device, on a display of the mobile device.

17. The method of claim 14 further comprising displaying, by the hardware device, the notification message on a display of the hardware device.

18. The method of claim 14 wherein the out-of-band channel comprises a BLUETOOTH® connection.

19. The method of claim 14 wherein said comparing the sequence of the monitored frames to pre-defined attack rule sequences comprises comparing the sequence of the monitored frames to pre-defined statistics characterizing normal behavior of the Wi-Fi network.

20. The method of claim 19 wherein the statistics characterizing normal behavior comprise an expected number of failed authentication frames, an expected number of de-authentication frames, and an expected number of action frames to switch communication channel.

21. The method of claim 20 further comprising:

determining, by said comparing the sequence of the monitored frames to pre-defined statistics, that the Wi-Fi network is exhibiting abnormal behavior; and launching, by the hardware device in response to said determining, the investigator program code to detect the access point's version or current configuration, and to check if the access point includes a splash screen and, if so, to download the splash screen.

* * * * *